(12) United States Patent
Doppler et al.

(10) Patent No.: US 8,638,719 B2
(45) Date of Patent: Jan. 28, 2014

(54) INTER-CELL INTERFERENCE COORDINATION OF MULTIPLE TRANSMISSION RANKS

(75) Inventors: Klaus Doppler, Espoo (FI); Cassio Ribeiro, Espoo (FI); Marko Lampinen, Oulu (FI); Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 663 days.

(21) Appl. No.: 12/958,911

(22) Filed: Dec. 2, 2010

(65) Prior Publication Data

US 2012/0140706 A1  Jun. 7, 2012

(51) Int. Cl.
*H04W 4/00* (2009.01)
(52) U.S. Cl.
USPC .......................................................... 370/328
(58) Field of Classification Search
None
See application file for complete search history.

(56) References Cited

U.S. PATENT DOCUMENTS

| 2006/0252436 A1* | 11/2006 | Tirkkonen et al. ............ 455/501 |
| 2010/0080154 A1* | 4/2010 | Noh et al. .................... 370/310 |
| 2011/0249767 A1* | 10/2011 | Chen et al. .................... 375/295 |

OTHER PUBLICATIONS

Marina Papatriantafilou et al., "Distributed Frequency Allocation for Cellular Networks: Trade-offs and Tuning Strategies," Proceedings of the 13th International Conference on Parallel and Distributed Computing and Systems (PDCS'01), 2001, pp. 339-344.

* cited by examiner

*Primary Examiner* — John Blanton
(74) *Attorney, Agent, or Firm* — Squire Sanders (US) LLP

(57) ABSTRACT

Inter-cell interference coordination of multiple transmission ranks can be accomplished by various methods and apparatuses. For example, a method can include defining indexing of resources for which a base station will restrict a maximum rank for transmission. The method can also include informing a neighboring base station of the first base station about the resources for which the base station will restrict the maximum rank of transmission.

20 Claims, 14 Drawing Sheets

Sub-frame →

| | | |
|---|---|---|
| 1 | 6 | 11 |
| 2 | 7 | 12 |
| 3 | 8 | 13 |
| 4 | 9 | 14 |
| 5 | 10 | 15 |

PRB ↓

(a)

Sub-frame →

| | | |
|---|---|---|
| 1 | 11 | 4 |
| 9 | 2 | 12 |
| 7 | 8 | 13 |
| 14 | 3 | 6 |
| 5 | 10 | 15 |

PRB ↓

(b)

Mapping between resources to an ordered list: (a) favoring frequency-selective scheduling, (b) exploiting time-frequency diversity in the frame.

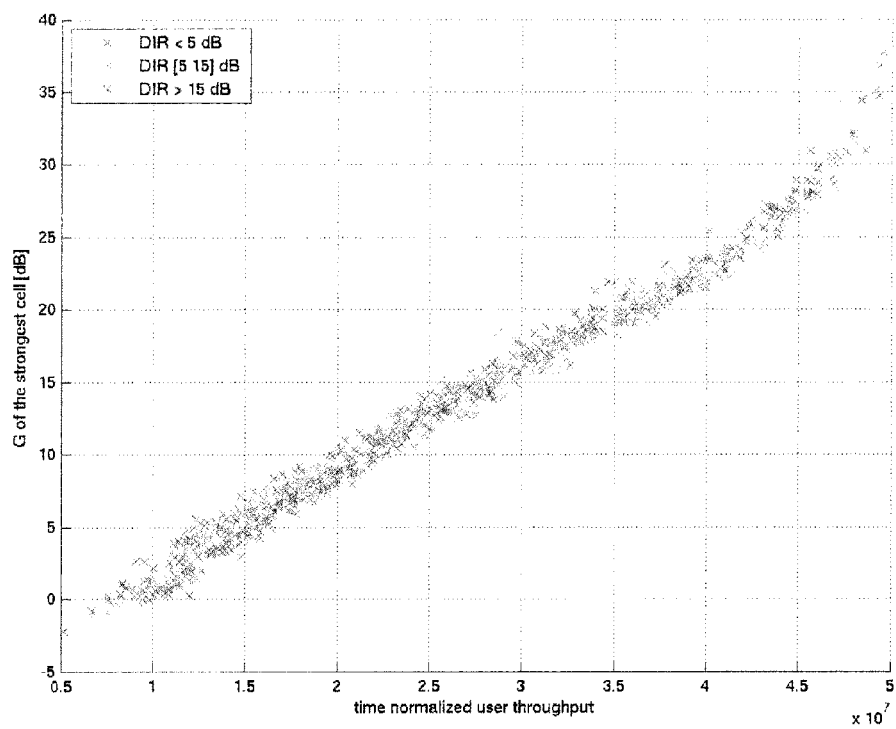
Figure 1 a) Interference cancellation without coordination of number of streams across cells Interference cancelation with coordination of
single stream transmission across neighboring cells.

Two cell scenario without coordination. Both single stream transmissions have some interference from dual stream transmissions in the neighboring cell. Interference cancelation is not possible.

Two cell scenario with coordination.
Both single stream transmissions have
only interference single stream transmissions
in the neighboring cells and the user throughput
can be improved by Interference cancelation.

Figure 4: Mapping between resources to an ordered list: (a) favoring frequency-selective scheduling, (b) exploiting time-frequency diversity in the frame.

Figure 5: Example agreement between BS1, BS2, and BS3: (a) initial agreement between BS1 and BS2, (b) agreement between BS2 and BS3, which is non-conflicting with the agreement in (a).

Figure 6: Bilateral agreement with explicit request for maximum rank in neighbor cell and in own cell.

Figure 7: Single stream resource coordination in local area scenario with direct interface between BSs. BS1 requests a definition of maximum rank per resource usage from BS2, which responds with an ACK or NACK to the request. BS1 then repeats the process with BS3 as a separate bilateral agreement.

Figure 8: Maximum rank request in a home eNB scenario without direct interface between home eNBs. The requests are sent to a Support Node and the forwarded to the other home eNB.

INTER-CELL INTERFERENCE COORDINATION OF MULTIPLE TRANSMISSION RANKS

BACKGROUND

1. Field

Inter-cell interference cancellation is a topic of interest for a variety of communication systems. For example, a local area radio system can complement existing cellular wide area systems (GSM/UMTS/HSPA/LTE). Unlike a wide area cellular system, a local area system can utilize time division duplex (TDD) bands to take advantage of the additional available bandwidth. Inter-cell interference reduction, such as provided by certain embodiments of the present invention, may benefit such systems. Inter-cell interference reduction can also be very useful for wide area systems with overlapping coverage area or in a co-channel deployment of wide area and local area networks, often referred to as heterogeneous networks.

2. Description of the Related Art

Inter-cell interference cancellation can be performed a variety of ways. In certain cases, cells with heavy mutual interference coordinate their resource usage. Thus, cells can be aware of the resources used by the other cell and can take that into account when scheduling their users.

Inter-cell interference cancellation can exhibit an inter-cell interference coordination mechanism. Some resources restrictions on power levels of single stream and multistream transmission are used. These approaches can assume that a radio system has an architecture that includes a radio network controller (RNC).

Other approaches call for cells with heavy mutual interference to coordinate their resource usage. The cells, therefore, must be aware of the resources used by the other cell and can take those resources into account when scheduling their users. In some cases, the cells negotiate the resources to be used. Other schemes involve coordinating inter-cell interference by defining resources with lower transmit power that will create less interference to neighboring cells.

Distributed signaling mechanisms for establishing a frequency reuse pattern can be based on local agreements between nodes, which become more complex as the number of variables in the negotiation increase.

SUMMARY

Certain embodiments provide a method. The method includes defining indexing of resources for which a base station will restrict a maximum rank for transmission. The method also includes informing a neighboring base station about the resources for which the base station will restrict the maximum rank of transmission.

In other embodiments, a method can include receiving, at a base station, information about indexing of resources for which a neighboring base station will restrict a maximum rank of transmission. The method can also include scheduling transmission for a cell of the base station taking into account the information about the indexing of the resources for which the neighboring base station will restrict a maximum rank of transmission.

In other embodiments, a computer-readable medium is encoded with instructions that, when executed in hardware, perform one of the preceding methods.

An apparatus, according to certain embodiments, includes at least one memory including computer program code and at least one processor. The at least one memory and the computer program code are configured to, with the at least one processor, cause the apparatus at least to define indexing of resources for which a base station will restrict a maximum rank for transmission. The at least one memory and the computer program code are also configured to, with the at least one processor, cause the apparatus at least to inform a neighboring base station about the resources for which the base station will restrict the maximum rank of transmission.

An apparatus, according to alternative embodiments, includes at least one memory including computer program code and at least one processor. The at least one memory and the computer program code are configured to, with the at least one processor, cause the apparatus at least to, upon receiving, at a base station, information about indexing of resources for which a neighboring base station will restrict a maximum rank of transmission, schedule transmission for a cell of the base station taking into account the information about the indexing of the resources for which the neighboring base station will restrict a maximum rank of transmission.

Certain embodiments also provide an apparatus that includes defining means for defining indexing of resources for which a base station will restrict a maximum rank for transmission. The apparatus also includes informing means for informing a neighboring base station about the resources for which the base station will restrict the maximum rank of transmission.

In other embodiments, an apparatus can include receiving means for receiving, at a base station, information about indexing of resources for which a neighboring base station will restrict a maximum rank of transmission. The apparatus can also include means for scheduling transmission for a cell of the base station taking into account the information about the indexing of the resources for which the neighboring base station will restrict a maximum rank of transmission.

BRIEF DESCRIPTION OF THE DRAWINGS

For proper understanding of the invention, reference should be made to the accompanying drawings, wherein:

FIGS. 1(a) and 1(b) illustrate interference cancellation performance.

DETAILED DESCRIPTION OF THE PREFERRED EMBODIMENT(S)

Certain embodiments of the present invention may relate to cellular networks, both wide area and local area, and particularly to the long term evolution (LTE) of the 3rd Generation Partnership Project (3GPP). Thus, certain embodiments of the present invention may be applicable to any base station (BS) or support node (SN), including an enterprise or femto gateway (GW), using a standardized radio protocol. These are non-limiting examples of implementations for the purposes of illustration.

Interference cancelation and rejection are techniques that can be used to improve the throughput in a multi-cell system. A multi-cell system can include an own cell, the cell of primary interest, and neighboring cells. By mitigating the interference from neighboring cells, the signal to interference and noise ratio of the own signal improves and the throughput increases.

The definition of a neighboring cell may be practical. That is to say, a cell may be a neighboring cell if it has an adjacent or overlapping coverage area to the cell of primary interest, or if it has signals that are significant for interference purposes in the cell of primary interest.

Interference mitigation provides the greatest benefit when applied under appropriate circumstances. In general, interference mitigation can provide the most benefit for users that experience heavy interference. If the neighboring cell uses multi-stream transmission (multi-stream transmission has a higher rank than single stream transmission whose rank is equal to 1), the interference cancelation or rejection may be hard to perform if the combined rank of the own cell transmission and the other cell transmission is larger than the number of receive antennas. In other words, typical linear interference suppression methods can efficiently suppress N−r interfering sources where N equals number of receive antennas and r is the rank of the signal of interest.

Figure 1B:
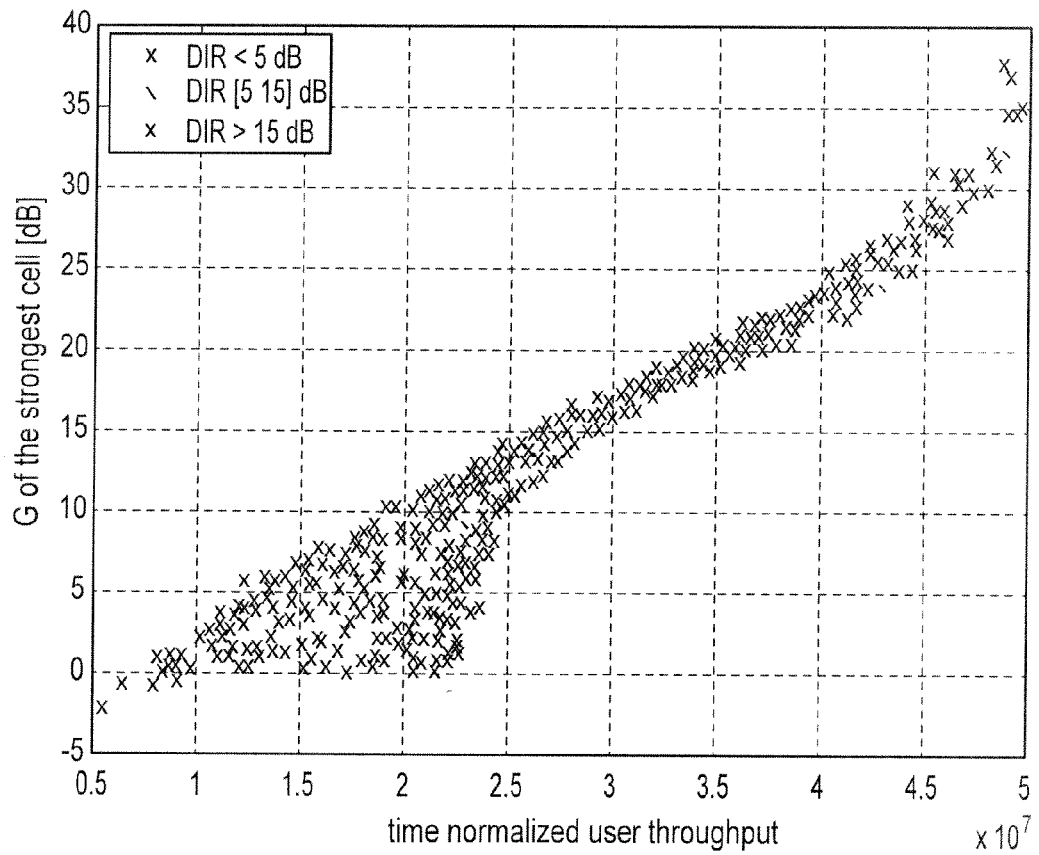

FIGS. 1(a) and 1(b) illustrate interference cancellation performance The gains from interference cancelation in FIG. 1(a) are limited. Points with high dominant to interferer ratio (DIR) have high potential for interference cancelation, but there are only marginal gains. The probability of using multiple streams in the studied indoor office scenario is 56%.

Therefore, it would be highly beneficial if the base station could schedule users with heavy interference from neighboring cells at resources where the neighboring cell uses only transmission with a limited number of streams. In FIG. 1(b) neighboring cells coordinate the usage of single stream transmission and high gains are visible: in many cases the user throughput is doubled.

Similarly, in uplink (UL) the base station may benefit from the knowledge of the resources where neighboring cells use transmissions of different ranks. Since the base station may know of its own ability to mitigate the interference from the neighboring cell, the base station can take such mitigation strategy into account when scheduling users and deciding on the modulation and coding scheme to be used.

In the LTE architecture, and in similar architectures, such as the LTE Advanced (LTE-A) architecture, higher level network elements in the radio access network (RAN) may not be natural candidates to handle inter-cell radio resource management (RRM). For this reason, inter-cell radio resource management, or inter-cell interference coordination (ICIC), as it is known in LTE, can be dealt with in a distributed manner, with signaling between evolved Node Bs (eNBs). This coordination or management can happen over the X2-interface over the transport network, or over some other means, for example over the air directly between base stations, or potentially relayed by one or more user equipment (UEs).

Distributed techniques can realize an inter-cell interference coordination scheme in which the base stations are allowed to schedule on all resources but some of the resources are restricted to a pre-determined number of spatial streams. Such a restriction may enable interference cancelation in neighboring cells. Approaches with such restrictions can permit simplified inter-base-station signaling, as described at greater length below.

Certain embodiments of the present invention can be applied, for example, to the following scenarios: a wide area scenario; a home eNB scenario with home eNB gateway; an enterprise home eNB scenario with gateway in the enterprise; and/or a local area scenario with independent networks.

Neighboring cells with high mutual interference can coordinate the usage of multi-stream transmissions in a distributed manner. In particular, neighboring cells define resources, restrict the maximum rank for transmission, and inform their neighboring cells about the definition of resources and/or the restriction on maximum rank. The neighboring cells can take this information into account in their scheduling procedure and thereby improve the user throughput in the neighborhood.

Figure 2:
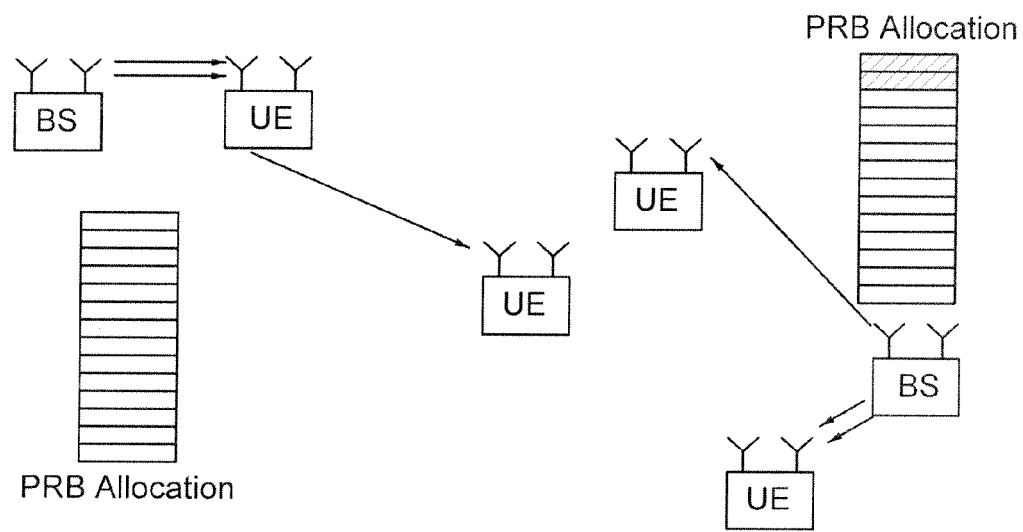
FIG. 2 illustrates a two cell scenario without coordination.

FIG. 2 illustrates a two cell scenario without coordination. In this scenario, the maximum number of transmit streams supported is two. Both base stations have (and use) full freedom to schedule physical resource blocks (PRBs) to single stream and dual stream transmissions over the whole bandwidth. As a result, user equipment close to the neighboring cell will experience interference from dual stream transmissions of the other cell with high probability. Such user equipment may be unable to cancel this interference and consequently the user throughput may be poor.

Figure 3:
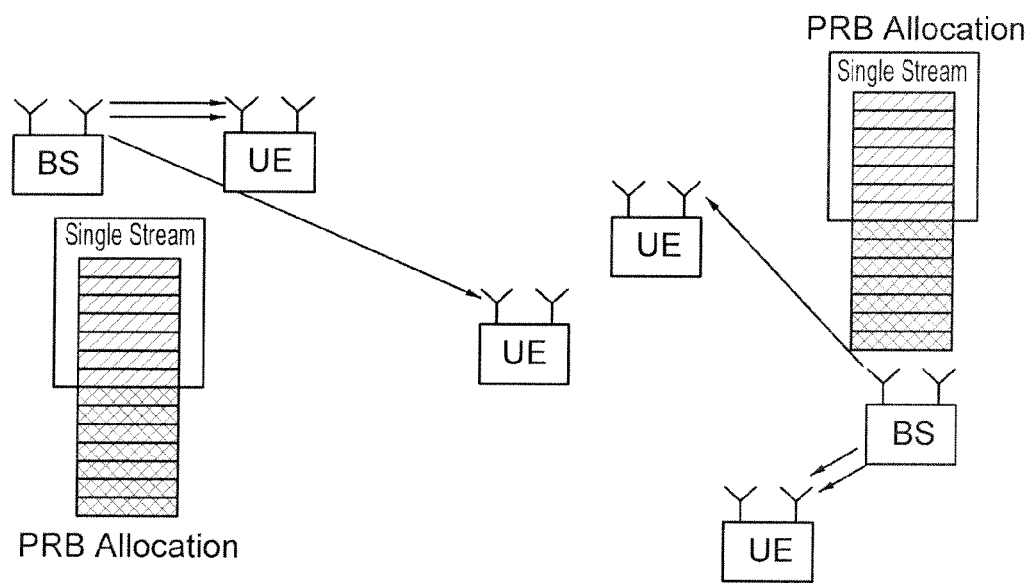
FIG. 3 illustrates two base stations coordinating the usage of single stream transmissions and reserving part of the physical resource blocks for single transmission only.

In FIG. 3, both base stations coordinate the usage of single stream transmissions and reserve part of the physical resource blocks for single transmission only. User equipment of both cells that are close to the neighboring cells may be able to cancel the interference and the user throughput may be increased. In FIG. 3, the coordination is done in the frequency domain and the possible choices are only between single-stream or dual-stream transmissions. However, the coordination approach discussed herein is more general than this example, and consequently can support time-frequency resources and multiple limits on maximum rank, as described below.

In order to coordinate the usage of resources in a distributed manner, the base stations can coordinate with each other about the resources used for each transmit rank. There are several options. One option is notification only. In this option, base station 1 (BS1) tells base station 2 (BS2) about its intended use of resources and corresponding maximum ranks. In another option there is an agreement of resources and the maximum rank for these resources by all cells in a local neighborhood. A neighborhood may be flexibly grouped, but may include, for example, around 5-10 cells. In a further option, one base station can request a limit on the number of streams from other base stations. For example, BS1 requests BS2 to use a specific maximum rank on a set of physical resource blocks and sub-frames for a specific time duration.

For effective communication, an agreement can be obtained among a certain interference neighborhood. This can be achieved by direct negotiations, which in general requires exchange of a large number of messages. The complexity of such negotiations can increase significantly with the number of variables. For example, techniques for negotiation on utilization of frequency resources can involve limiting the basic messages to taking or releasing some resources to be in use. If the choices are limited between single-stream or multi-stream transmissions, these messages can be re-interpreted to mean taking and releasing single-stream resources, and hence similar convergence properties can be expected, and similar number of messages would be required. However, as an alternative, the number of streams can be agreed independently for each resource, implying that the number of messages to be interchanged and corresponding convergence time of the negotiation process may become quite large.

A further alternative is an approach where a set of policies is defined that determines an ordering of resources in the time-frequency frame, as well as how a maximum transmit rank can be requested for these resources. The local communication between the base stations is based on this set of policies, in a way that it is sufficient to establish bilateral agreements between base stations, instead of a common agreement among a plurality of base stations in a neighborhood.

Embodiments of the present invention may have various characteristics. For example, certain embodiments of the present invention provide a simplified distributed mechanism to coordinate utilization of multi-stream transmissions among base stations that require only bilateral agreements between base stations. Additionally, certain embodiments of the present invention provide policies that guide operation of the simplified distribution mechanism, which can be signaled by a central node, agreed between all nodes in a neighborhood in a slower time scale, or defined by an industrial standard. Moreover, certain embodiments of the present invention allow coordination between multiple transmission ranks in an interference cancellation scheme. In further embodiments of the present invention, a base station announces the maximum rank of transmission for its own transmission in the signaling exchange. This announcement can be made, for example, when requesting restricted usage of maximum rank from another base station.

The simplified signaling scheme outlined above is based on a set of policies which can be signaled by a central node, agreed between all nodes in a neighborhood in a slower time frame, or defined by an industrial standard.

Aspects of communication to be defined by such network policies include mapping of time-frequency resources to an ordered list of resources; setting the order in which the resources can be taken into use for different maximum number of streams; specifying whether there is a correspondence between the maximum number of streams to be used by the neighbors and the maximum number of streams to be used in own cell (in a negative case, these two sets of information have to be signaled separately); and defining how a previous agreement between two nodes can be updated in order to establish a new agreement with a third-party.

Figure 4:
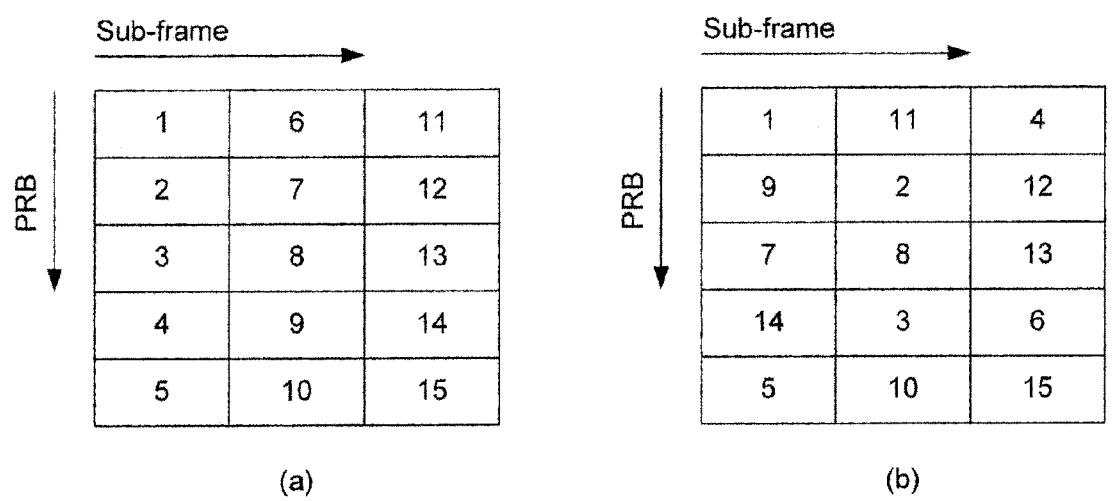
FIGS. 4(a) and 4(b) illustrate two examples of how resources can be mapped to an ordered list.

FIGS. 4(a) and 4(b) show two examples of how the resources could be mapped to an ordered list. In FIG. 4(a) the ordering is such that implementation of a frequency-selective scheduling strategy for each transmission rank would be straightforward, while in FIG. 4(b) the mapping is such that frequency diversity in the time-frequency resource grid is exploited. Other orderings are also permitted.

Given a certain mapping of resources, one feasible approach is to specify that the transmission ranks can be specified only in an ascending order of rank and resources on the list. For example, it is possible to specify that resources 1-10 use rank 1, resources 11-27 use rank 2, and resources 28-40 use unrestricted rank. However, it would not be allowed to have resources 1-10 using rank 2 and resources 11-27 using rank 1, for example.

The mapping of users with certain rank to the indexed resources does not even need to be a strict limitation during the scheduling. If the resource indexing is agreed between the cells, either by standard or by negotiations, one can sort the users which are chosen to be scheduled simultaneously according to the requested rank. The users are then assigned to the resources in this order. This should guarantee that the other end of the ordered resource group has rank 1 and the other end has the highest rank with high probability if there are multiple users in a cell. Of course, there will be a grey area in the middle where rank can change from cell to cell and from time to time.

Figure 5:
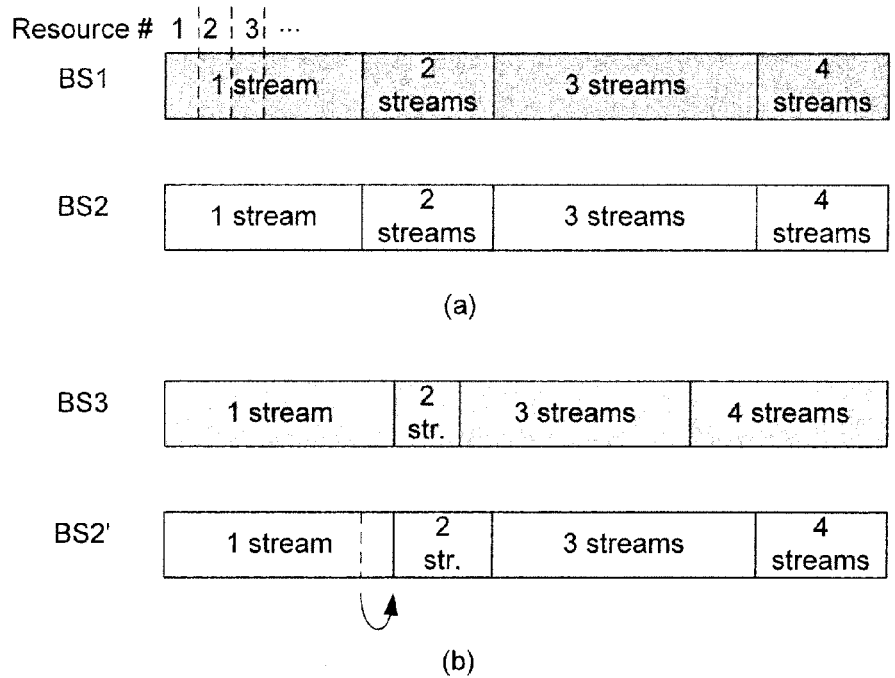
FIGS. 5(a) and 5(b) illustrate a valid resources map agreed between two base stations, and the modification of the resource map of one base station due to a new agreement with a third base station.

Assuming there is a one-to-one correspondence between the requested rank from neighbors' transmission and the rank used in the base station's own cell, an example agreement between BS1 and BS2 is given in FIG. 5(a). Once this bilateral agreement is set, BS2 negotiates with BS3, which has a different requirement for the resources assigned to different ranks, as shown in FIG. 5(b). In order to resolve this conflict, the following rule can be set: a change to a previous agreement can only be made by shifting the border between two ranks in ascending order of resource number.

In terms of the graphical representation in FIGS. 5(a) and 5(b), this limitation on changes in previous agreements means that a new agreement can only modify another valid agreement by shifting the transition point between two ranks to the right, but never to the left. This is shown in FIG. 5(b), where the new definition of rank borders for BS2 is denoted as BS2'. Note that BS2' is not equal to neither BS1 nor BS3, but they are not conflicting. Moreover, a requirement to specify a correspondence between the number of streams of neighbors and own cell can guarantee that all three base stations have a common understanding on how the rank limitation is applied in the neighboring cells and can decide on which type of interference cancellation mechanism to apply, if any.

Figure 6:
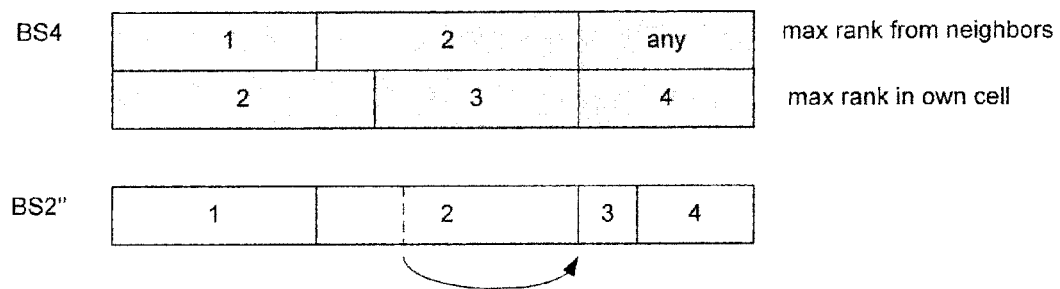
FIG. 6 illustrates a bilateral agreement with an explicit request for maximum rank in own cell and neighboring cell.

A variation on the requirement to specify a correspondence between the number of streams of neighbors and own cell is to require two separate messages from the base station, indicating the maximum transmission rank required from neighbors in the ordered resources and the maximum transmission rank applied in the own cell for the same resources. For example, BS2 may be further negotiating with BS4 for resources, where BS4 is explicitly indicating the different maximum transmission ranks. This situation is illustrated in FIG. 6. Note that in this case BS2' must modify its resource allocation for rank 2 transmissions by shifting to the right in order to meet BS4 requirements, but it may not be able to do effective interference cancellation in some of the resources due to higher rank transmissions from BS4. The indication of maximum rank in own cell is informative and can be used by BS2 to decide whether or not to comply with the requirement. For example, if BS4's requirement would impose a severe capacity penalty for BS2, it could decide to ignore the request, or make a counter-proposal in which the capacity penalty is limited to a maximum acceptable level.

In any case, after one bilateral agreement expires or is revoked for any other reason, the other base stations are free to readjust the maximum rank restrictions applied in the own cell by shifting the transitions between ranks to the left, as long as it does not violate any of the valid bilateral agreements.

Figure 7:
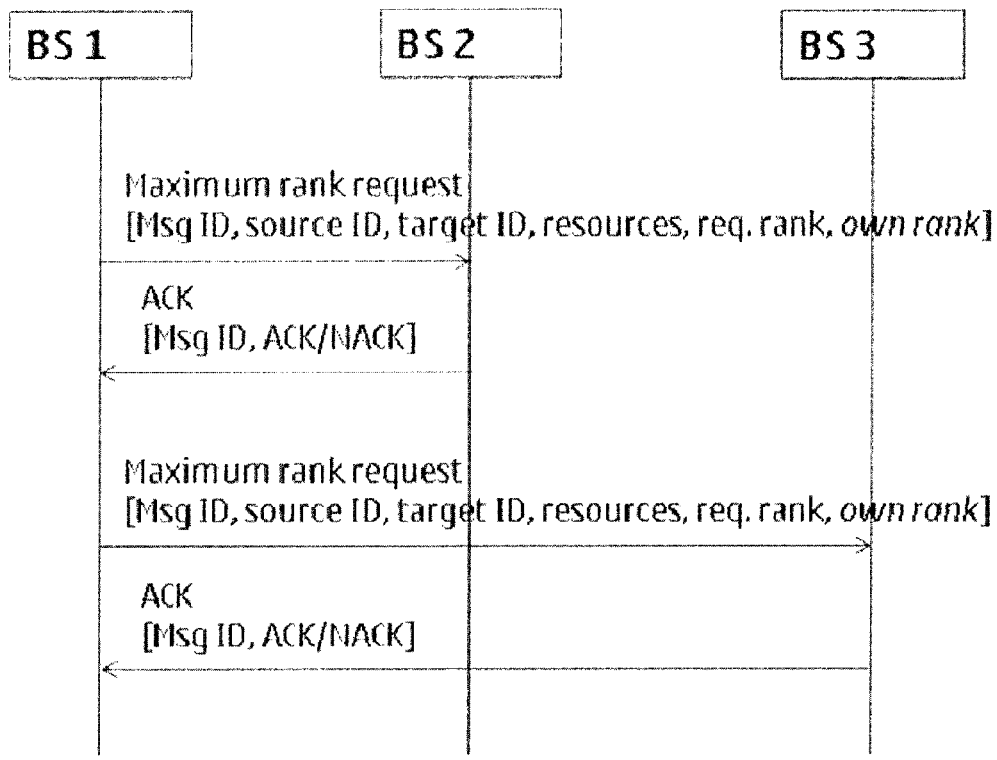
FIG. 7 illustrates a signaling exchange for bilateral agreements.

FIG. 7 illustrates a local area scenario with direct interface between the base stations as it could be found within an enterprise network, and consequently can illustrate signaling exchange for bilateral agreements. The base stations can directly send maximum transmission rank requests to each other. The message ID identifies that it is a maximum transmit rank request, the source ID identifies the requesting base station, and the target ID provides the identification of the base station to which the message is directed. The remainder of the message, in this example, defines the resources and corresponding maximum ranks. Possible message formats for the resource indication include: number of resources and rank indication for each possible rank up to a certain pre-defined limit (the order and mapping to physical resources may be given by the policies described above); or bitmap of ranks in use from a set of allowed ranks, and number of resources.

The source and target IDs may be omitted if their meaning is obvious from the context. The meaning may be obvious, for example, if other identifiers have already been exchanged for establishment of the connection between the base stations.

Figure 8:
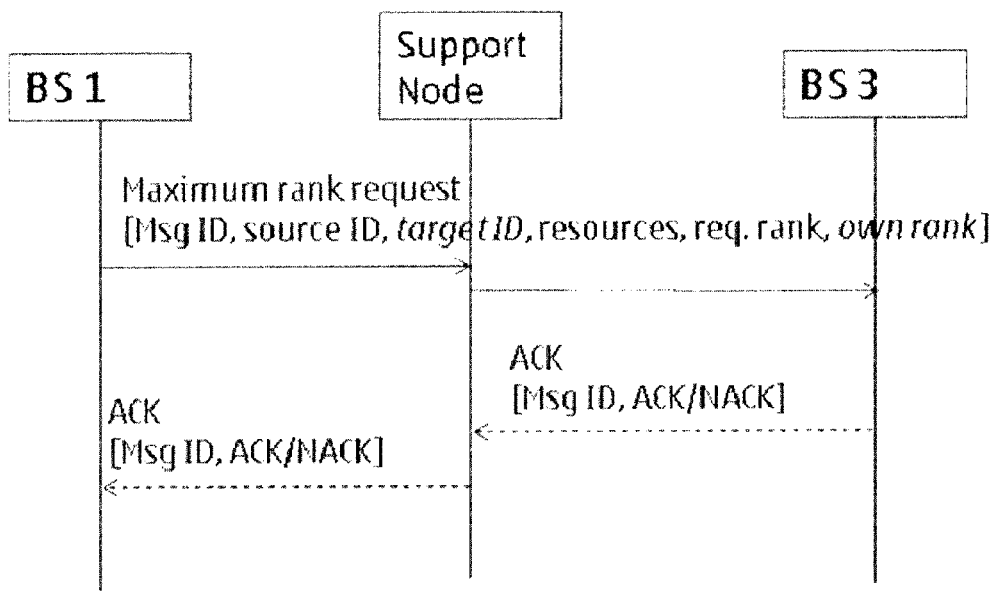
FIG. 8 illustrates a scenario where the base station does not have a direct interface with the other base stations, but they have a connection to a central node.

FIG. 8 illustrates a scenario where the base station does not have a direct interface with the other base stations. In such a case, a support node can be utilized to receive the requests and to forward them to the target base station. Depending on the role of the support node, the support node can decide if the request should be granted or not, and then forward a notification to home BS3. If the support node decides if the request should be granted, the acknowledgement of BS3 could be optional, but the response to the requesting BS1 may be mandatory.

In another implementation, the support node could collect all requests from the base stations in a neighborhood and propose a set of resources and ranks to be used among those base stations. It then sends out these proposed resources to all corresponding base station.

The support node can be various nodes. For example, the support node may be an enterprise gateway/controller in an enterprise scenario or a home eNB gateway in a residential home eNB (Femto) deployment.

Moreover, there are a variety of implementation options. The maximum rank requests can have a pre-defined validity defined in units of time or frame counters, they can be valid until further notice, or the validity can be part of the message. The direct interface between the base stations can be an existing X2 interface in the wide area network or an X2 type of interface in an enterprise network. The interface may go over the transport network, over the air from base station to base station, or it may be based on UE-relaying.

There are also few alternatives as to how to realize UE relaying between base stations. For example, BS1 can broadcast its intended maximum rank usage. UE2, a user equipment of a neighboring cell with high interference from BS1, can decode this information and forward it to its own base station, BS2. BS2 then, in this example, uses the information and tries to preferably schedule UE2 on these resources.

In another example, based on hand-over measurements reported by UE1, served by BS1, BS1 knows that UE1 is close to the cell border with BS2. BS1 sends a relaying control packet to a UE1, asking it to relay the packet to BS2. BS1 does this either over the RACH interface in cell 2, or establishes a control connection with BS2 using dedicated uplink control channel resources.

In a further example, BS1 and BS2 have established a control interface over a UE1 or UE2, which is used for multiple purposes, including the inter-cell interference coordination signaling. In another example, together with a negative acknowledgment (NACK), the responding base station can suggest alternative resources to be used each supported rank.

Certain embodiments of the present invention may have various advantages. For example, certain embodiments of the present invention may permit effective use of interference cancelation/rejection to improve the user throughput in a multi-cell network in a scenario where there is no centralized control over the radio resources. The interference coordination scheme may allow the base station to use all resources. This improved use of resources can increase the spectrum utilization compared to interference coordination schemes where cells with high mutual interference do not schedule users on part of their assigned resources. The simplified signaling mechanism discussed above can allow for a distributed coordination of resources without the need for lengthy consensus-reaching process, since the negotiations can be based on bilateral agreements alone. Accordingly, certain embodiments of the present invention provide a simplified mechanism that is able to achieve coordination based only on bilateral agreements between nodes.

Figure 9:
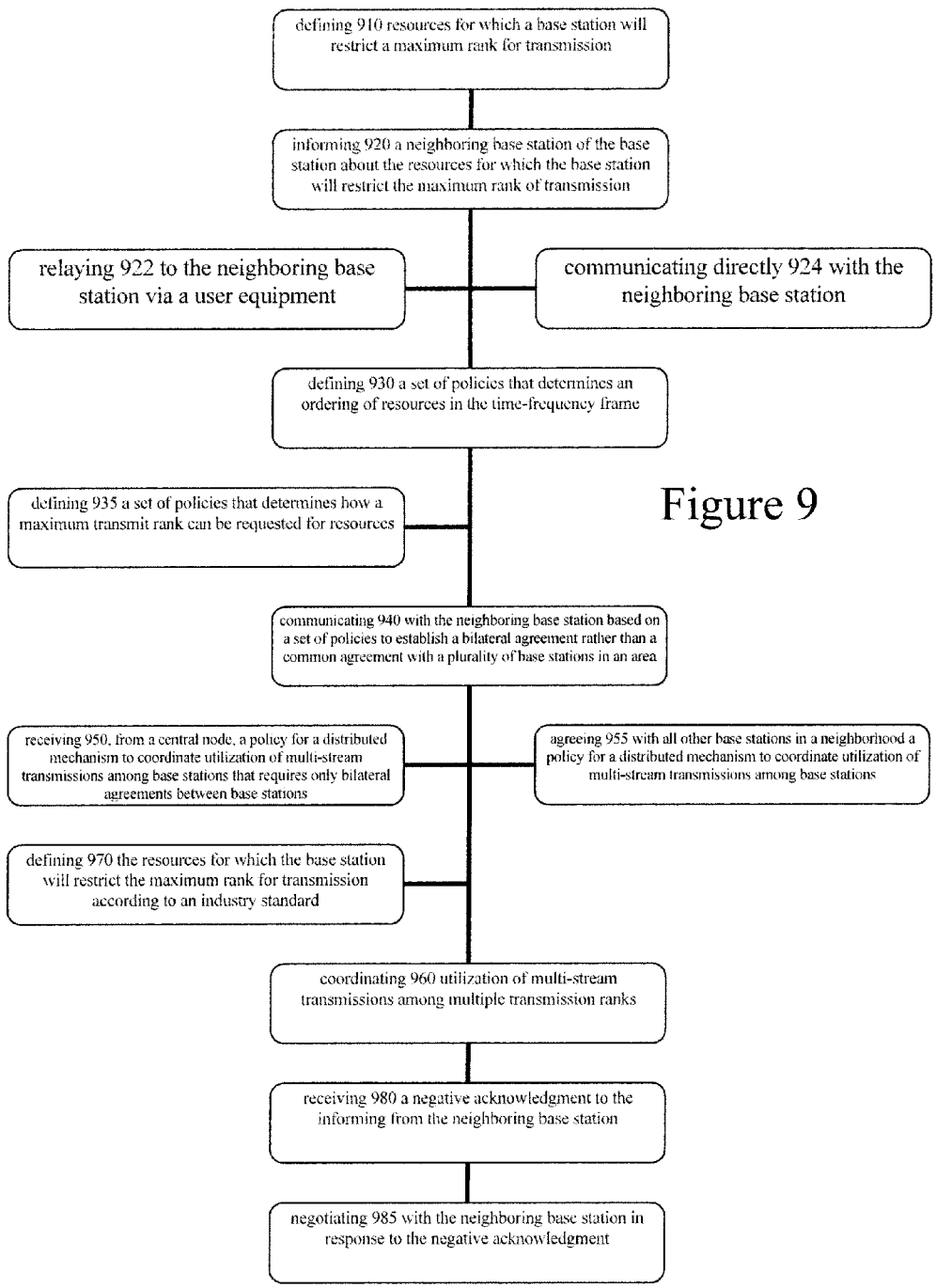
FIG. 9 illustrates a method according to certain embodiments.

FIG. 9 illustrates a method according to certain embodiments of the present invention. As shown in FIG. 9, a method can include defining 910 resources for which a base station will restrict a maximum rank for transmission. For example, the defining 910 resources may include defining indexing of the resources. The method can also include informing 920 a neighboring base station of the first base station about the resources for which the base station will restrict the maximum rank of transmission. The informing 920 can include relaying 922 to the neighboring base station via a user equipment, or communicating directly 924 with the neighboring base station.

The method can additionally include defining 930 a set of policies that determines an ordering of resources in the time-frequency frame. The method can also include defining 935 a set of policies that determines how a maximum transmit rank can be requested for resources. The method can further include communicating 940 with the neighboring base station based on a set of policies to establish a bilateral agreement rather than a common agreement with a plurality of base stations in an area.

The method can include receiving 950, from a central node, a policy for a distributed mechanism to coordinate utilization of multi-stream transmissions among base stations that requires only bilateral agreements between base stations. The method can further include agreeing 955 with all other base stations in a neighborhood a policy for a distributed mechanism to coordinate utilization of multi-stream transmissions among base stations. The method can also include coordinating 960 utilization of multi-stream transmissions among multiple transmission ranks.

The method can include defining 970 the resources for which the base station will restrict the maximum rank for transmission according to an industry standard. The method can further include receiving 980 a negative acknowledgment to the informing from the neighboring base station and negotiating 985 with the neighboring base station in response to the negative acknowledgment.

Figure 10:
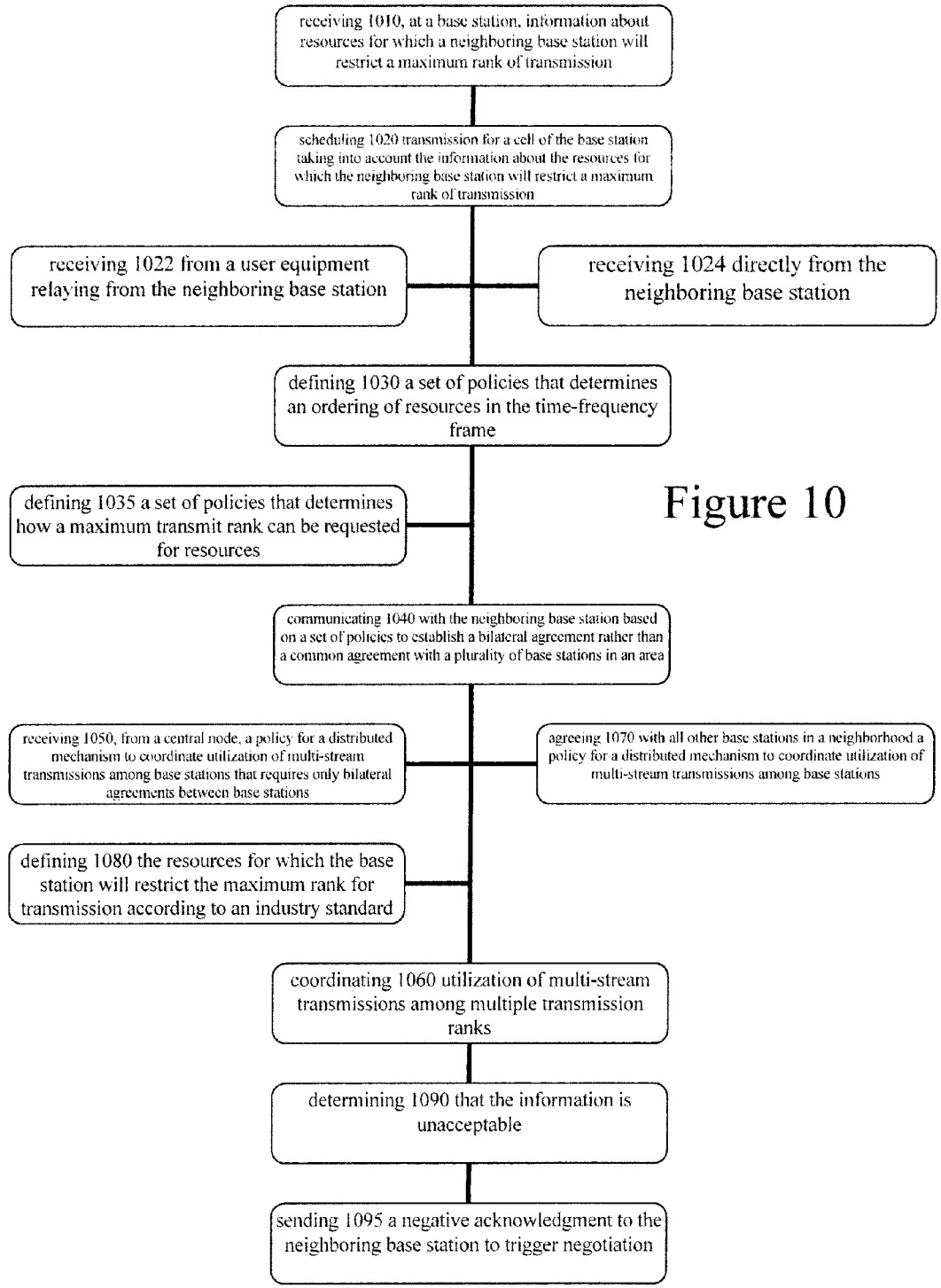
FIG. 10 illustrates a method according to certain embodiments.

FIG. 10 illustrates a method according to certain embodiments of the present invention. In the illustrated embodiments, the method includes receiving 1010, at a base station, information about resources for which a neighboring base station will restrict a maximum rank of transmission. The method also includes scheduling 1020 transmission for a cell of the base station taking into account the information about the resources for which the neighboring base station will restrict a maximum rank of transmission. The receiving 1020 can include receiving 1022 from a user equipment relaying from the neighboring base station or receiving 1024 directly from the neighboring base station.

The method can include defining 1030 a set of policies that determines an ordering of resources in the time-frequency frame. The method can also include defining 1035 a set of policies that determines how a maximum transmit rank can be requested for resources.

The method can include communicating 1040 with the neighboring base station based on a set of policies to establish a bilateral agreement rather than a common agreement with a plurality of base stations in an area. The method can further include receiving 1050, from a central node, a policy for a distributed mechanism to coordinate utilization of multi-stream transmissions among base stations that requires only bilateral agreements between base stations. The method can further include coordinating 1060 utilization of multi-stream transmissions among multiple transmission ranks.

The method can include agreeing 1070 with all other base stations in a neighborhood a policy for a distributed mechanism to coordinate utilization of multi-stream transmissions among base stations. The method can also include defining 1080 the resources for which the base station will restrict the maximum rank for transmission according to an industry standard.

The method can further include determining 1090 that the information is unacceptable and sending 1095 a negative acknowledgment to the neighboring base station to trigger negotiation.

The methods illustrated in FIGS. 9-10 can be variously implemented. For example, the methods can implemented in a hardware-only implementation, or the methods can be implemented by hardware running software. The software may take the form of instructions or a computer program. The computer program may be embodied on a computer-readable medium, such as a storage or non-transitory medium.

Figure 11:
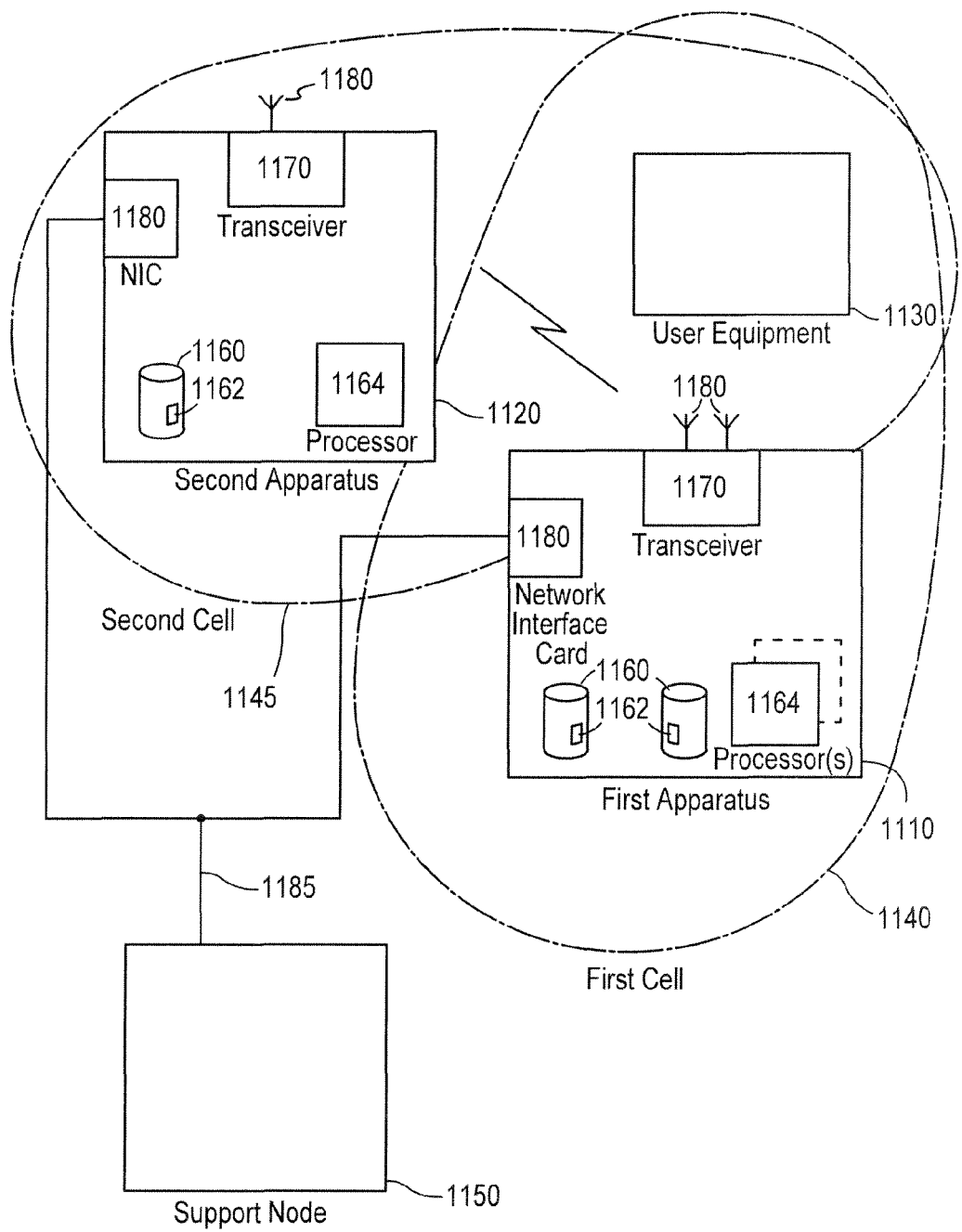
FIG. 11 illustrates a system according to certain embodiments.

FIG. 11 illustrates a system according to certain embodiments of the present invention. As illustrated in FIG. 11, the system includes a first apparatus 1110, which may be a base station, and a second apparatus 1120, which may be a neighbor base station to the first base station. In this situation, each base station may be considered the neighbor of the other base station. The system may also include user equipment 1130, which may be located within a first cell 1140 corresponding to the first apparatus 1110 or a second cell 1145 corresponding to the second apparatus 1120. Additionally, a support node 1150 may be in communication with the first apparatus 1110 and the second apparatus 1120.

Each of the first apparatus 1110 and the second apparatus 1120 may have a similar construction. Each may include at least one memory 1160 including computer program code 1162 and at least one processor 1164.

The at least one memory 1160 may be any suitable computer-readable storage medium, such as a hard disc drive, a random access memory (RAM), or a read only memory (ROM). The computer program code 1162 may be any suitable form of instructions readable by a computer, such as compiled instructions or interpreted instructions. The at least one processor 1164 may be one or more central processing unit (CPU), controller, or the like. The at least one memory 1160 and the at least one processor 1164 can be embodied on a single chip.

The at least one memory 1160 and the computer program code 1162 can be configured to, with the at least one processor 1164, cause the first apparatus 1110 or the second apparatus 1120 at least to perform a method, such as one of the methods illustrated in FIG. 9 and FIG. 10.

Thus, for example, the at least one memory 1160 and the computer program code 1162 can be configured to, with the at least one processor 1164, cause the first apparatus 1110 at least to define resources for which a base station will restrict a maximum rank for transmission and inform a neighboring base station, such as second apparatus 1120, of the first base station about the resources for which the base station will restrict the maximum rank of transmission.

The at least one memory 1160 and the computer program code 1162 can also be configured to, with the at least one processor 1164, cause the first apparatus 1110 at least to communicate with the neighboring base station based on a set of policies to establish a bilateral agreement rather than a common agreement with a plurality of base stations in an area.

The at least one memory 1160 and the computer program code 1162 can further be configured to, with the at least one processor 1164, cause the first apparatus 1110 at least to coordinate utilization of multi-stream transmissions among multiple transmission ranks. Also, the at least one memory 1160 and the computer program code 1162 can be configured to, with the at least one processor 1164, cause the first apparatus 1110 at least to agree with all other base stations in a neighborhood a policy for a distributed mechanism to coordinate utilization of multi-stream transmissions among base stations.

Moreover, the at least one memory 1160 and the computer program code 1162 can be configured to, with the at least one processor 1164, cause the first apparatus 1110 at least to inform the neighboring base station by relaying to the neighboring base station via a user equipment. The at least one memory 1160 and the computer program code 1162 can additionally be configured to, with the at least one processor 1164, cause the first apparatus 1110 at least to, upon receiving a negative acknowledgment to the informing from the neighboring base station, negotiate with the neighboring base station in response to the negative acknowledgment.

In another embodiment, the at least one memory 1160 and the computer program code 1162 can be configured to, with the at least one processor 1164, cause the first apparatus 1110 at least to define indexing of resources for which a base station (such as first apparatus 1110) will restrict a maximum rank for transmission and inform a neighboring base station (such as second apparatus 1120) about the resources for which the base station will restrict the maximum rank of transmission. The at least one memory 1160 and the computer program code 1162 can further be configured to, with the at least one processor 1164, cause the first apparatus 1110 at least to apply a policy where the transmitted signals are sorted according to the rank and are mapped to the indexed resources in ascending or descending order. Moreover, the at least one memory 1160 and the computer program code 1162 can also be configured to, with the at least one processor 1164, cause the first apparatus 1110 at least to, upon receiving conflicting information on the resources from the neighboring base station, adjust the lower rank regions in the own resource map towards complying with the conflicting information from the neighboring cell Likewise, the at least one memory 1160 and the computer program code 1162 can be configured to, with the at least one processor 1164, cause the second apparatus 1120 at least to, upon receiving, at a base station, information about resources for which a neighboring base station, such as first apparatus 1110, will restrict a maximum rank of transmission, schedule transmission for a cell of the base station taking into account the information about the resources for which the neighboring base station will restrict a maximum rank of transmission.

The at least one memory 1160 and the computer program code 1162 can be configured to, with the at least one processor 1164, cause the second apparatus 1120 at least to communicate with the neighboring base station based on a set of policies to establish a bilateral agreement rather than a common agreement with a plurality of base stations in an area. The at least one memory 1160 and the computer program code 1162 can also be configured to, with the at least one processor 1164, cause the second apparatus 1120 at least to coordinate utilization of multi-stream transmissions among multiple transmission ranks.

Also, the at least one memory 1160 and the computer program code 1162 can be configured to, with the at least one processor 1164, cause the second apparatus 1120 at least to agree with all other base stations in a neighborhood a policy for a distributed mechanism to coordinate utilization of multi-stream transmissions among base stations. Moreover, the at least one memory 1160 and the computer program code 1162 can be configured to, with the at least one processor 1164, cause the second apparatus 1120 at least to determine that the information is unacceptable and send a negative acknowledgment to the neighboring base station to trigger negotiation.

In another embodiment, the at least one memory 1160 and the computer program code 1162 can be configured to, with the at least one processor 1164, cause the second apparatus 1120 at least to, upon receiving, at a base station (such as second apparatus 1120), information about indexing of resources for which a neighboring base station (such as first apparatus 1110) will restrict a maximum rank of transmission, schedule transmission for a cell of the base station taking into account the information about the indexing of the resources for which the neighboring base station will restrict a maximum rank of transmission.

The at least one memory 1160 and the computer program code 1162 can also be configured to, with the at least one processor 1164, cause the second apparatus 1120 at least to apply a policy where the transmitted signals are sorted according to the rank and are mapped to the indexed resources in ascending or descending order. The at least one memory 1160 and the computer program code 1162 can further be configured to, with the at least one processor 1164, cause the second apparatus 1120 at least to, upon receiving conflicting information on the resources from the neighboring base station, adjust the lower rank regions in the own resource map towards complying with the conflicting information from the neighboring cell.

Each of the first apparatus 1110 and the second apparatus 1120 may also have transceiver units 1170, which may be configured to perform transmission and reception functions. The transceiver units 1170 may be operably coupled to one or more antennas 1180. Thus, each of the first apparatus 1110 and the second apparatus 1120 may be able to communicate with one another and/or with the user equipment 1130 over a wireless link 1175.

Each of the first apparatus 1110 and the second apparatus 1120 may also have network cards 1180, which may be configured to connect to a support node 1190 via a wired network 1185.

Figure 12:
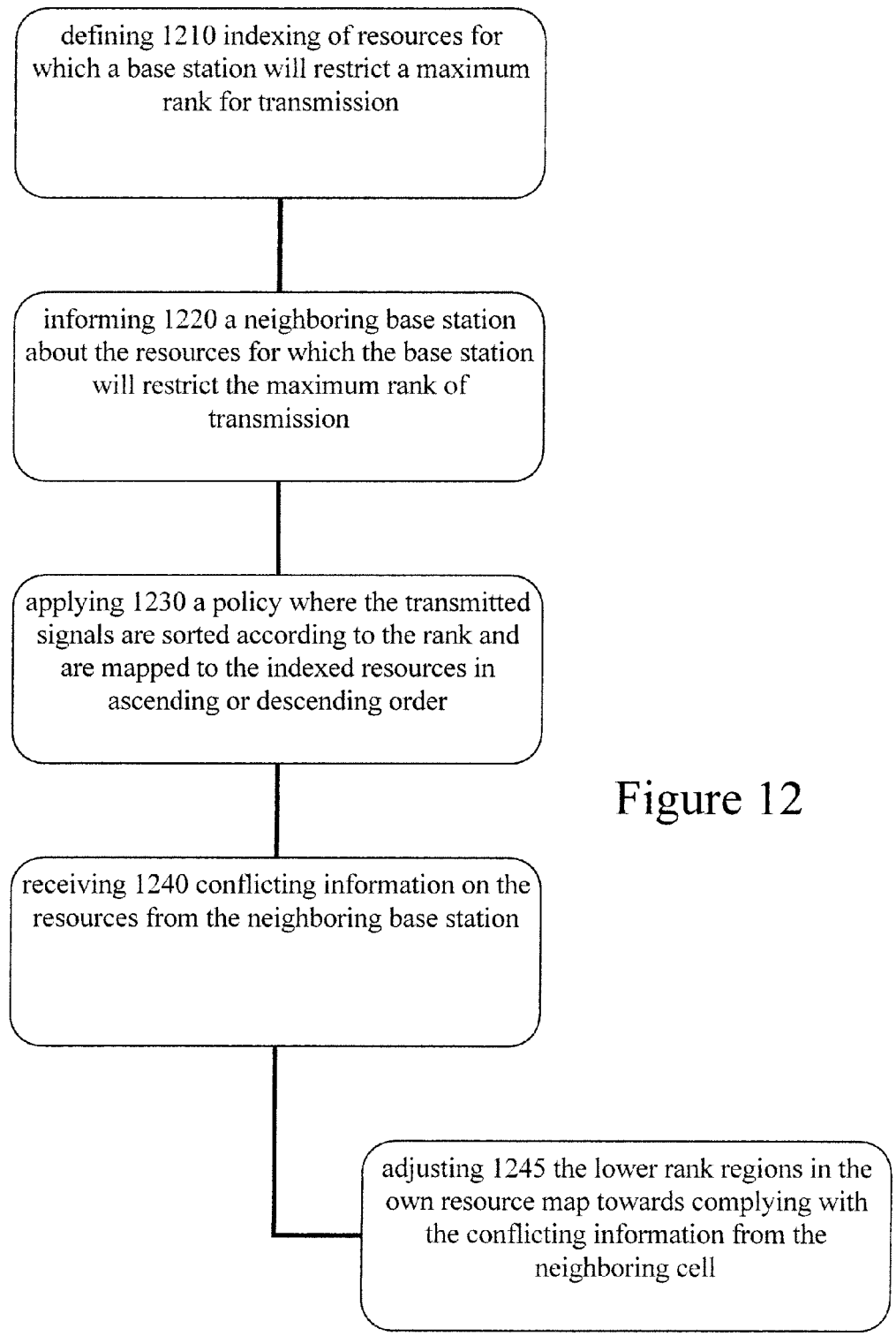
FIG. 12 illustrates another method according to certain embodiments of the present invention.

FIG. 12 illustrates another method according to certain embodiments of the present invention. The method of FIG. 12 includes defining 1210 indexing of resources for which a base station will restrict a maximum rank for transmission. The method also includes informing 1220 a neighboring base station about the resources for which the base station will restrict the maximum rank of transmission. The neighboring base station may be understood to be a neighbor of the first base station.

The method can further include applying 1230 a policy where the transmitted signals are sorted according to the rank and are mapped to the indexed resources in ascending or descending order.

The method can also include receiving 1240 conflicting information on the resources from the neighboring base station and adjusting 1245 the lower rank regions in the own resource map towards complying with the conflicting information from the neighboring cell. The method may also include one or more of the steps illustrated in FIG. 9.

Figure 13:
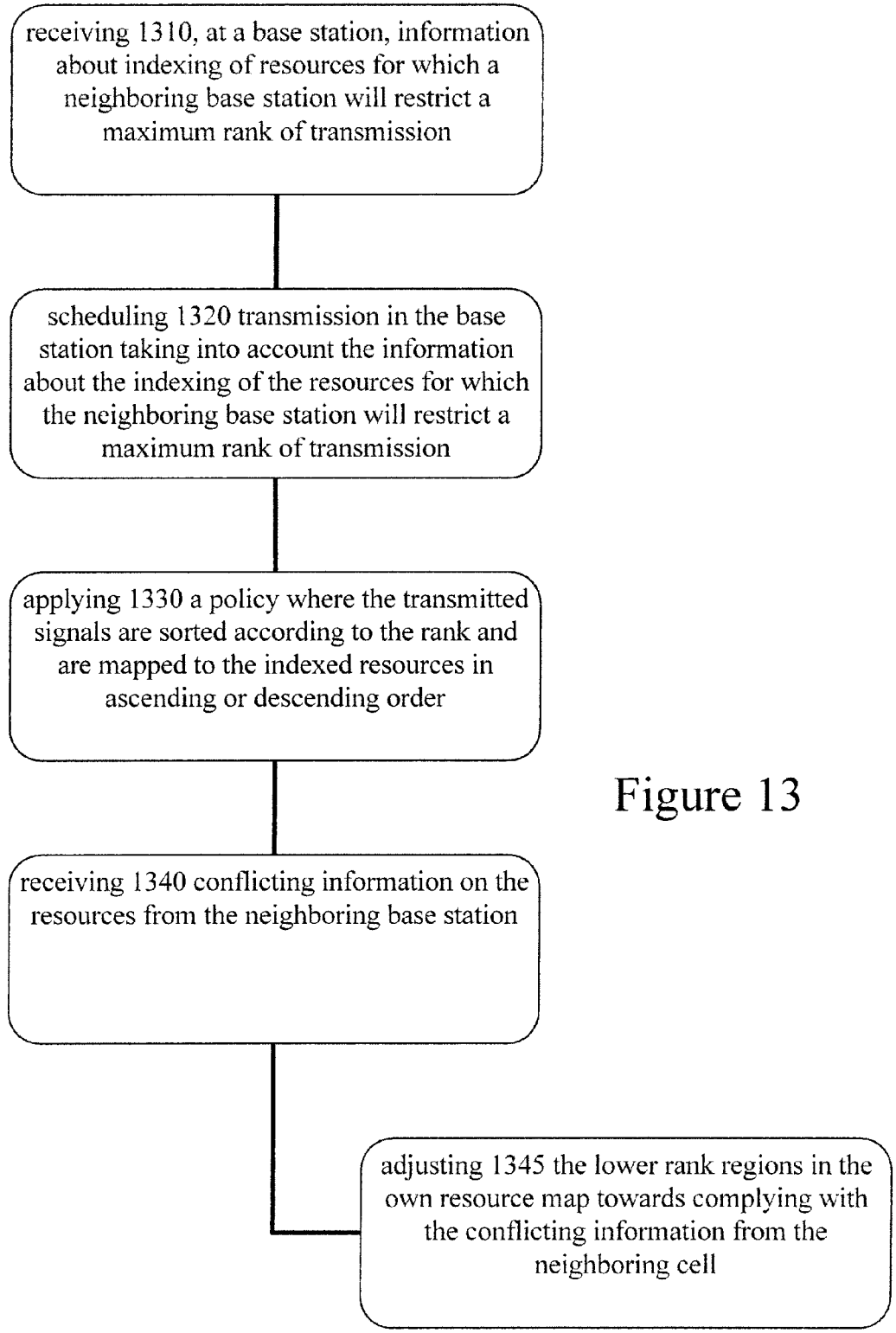
FIG. 13 illustrates another method according to certain embodiments of the present invention.

FIG. 13 illustrates another method according to certain embodiments of the present invention. The method, as shown in FIG. 13, includes receiving 1310, at a base station, information about indexing of resources for which a neighboring base station will restrict a maximum rank of transmission. The method also includes scheduling 1320 transmission in the base station taking into account the information about the indexing of the resources for which the neighboring base station will restrict a maximum rank of transmission.

The method further includes applying 1330 a policy where the transmitted signals are sorted according to the rank and are mapped to the indexed resources in ascending or descending order. The method additionally includes receiving 1340 conflicting information on the resources from the neighboring base station and adjusting 1345 the lower rank regions in the own resource map towards complying with the conflicting information from the neighboring cell. The method may also include one or more of the steps illustrated in FIG. 10.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   defining indexing of resources for which a base station will restrict a maximum rank for transmission; and
   informing a neighboring base station about the resources for which the base station will restrict the maximum rank of transmission.

2. The method of claim 1, further comprising:
   defining a set of policies that determines how a maximum transmit rank can be requested for resources.

3. The method of claim 1, further comprising:
   receiving, from a central node, a policy for a distributed mechanism to coordinate utilization of multi-stream transmissions among base stations that requires only bilateral agreements between base stations.

4. The method of claim 1, further comprising:
   agreeing with all other base stations in a neighborhood a policy for a distributed mechanism to coordinate utilization of multi-stream transmissions among base stations.

5. The method of claim 1, further comprising:
   applying a policy where the transmitted signals are sorted according to the rank and are mapped to the indexed resources in ascending or descending order.

6. The method of claim 1, further comprising:
communicating with the neighboring base station based on a set of policies to establish a bilateral agreement rather than a common agreement with a plurality of base stations in an area.

7. The method of claim 1, further comprising:
coordinating utilization of multi-stream transmissions among multiple transmission ranks.

8. The method of claim 1, further comprising:
receiving a negative acknowledgment to the informing from the neighboring base station; and
negotiating with the neighboring base station in response to the negative acknowledgment.

9. The method of claim 1, further comprising:
receiving conflicting information on the resources from the neighboring base station; and
adjusting the lower rank regions in the own resource map towards complying with the conflicting information from the neighboring cell.

10. The method of claim 1, further comprising:
defining the resources for which the base station will restrict the maximum rank for transmission according to an industry standard.

11. A method, comprising:
receiving, at a base station, information about indexing of resources for which a neighboring base station will restrict a maximum rank of transmission; and
scheduling transmission in the base station taking into account the information about the indexing of the resources for which the neighboring base station will restrict a maximum rank of transmission.

12. The method of claim 11, further comprising:
defining a set of policies that determines how a maximum transmit rank can be requested for resources.

13. The method of claim 11, further comprising:
receiving, from a central node, a policy for a distributed mechanism to coordinate utilization of multi-stream transmissions among base stations that requires only bilateral agreements between base stations.

14. The method of claim 11, further comprising:
agreeing with all other base stations in a neighborhood a policy for a distributed mechanism to coordinate utilization of multi-stream transmissions among base stations.

15. The method of claim 11, further comprising:
applying a policy where the transmitted signals are sorted according to the rank and are mapped to the indexed resources in ascending or descending order.

16. The method of claim 11, further comprising:
communicating with the neighboring base station based on a set of policies to establish a bilateral agreement rather than a common agreement with a plurality base stations in an area.

17. The method of claim 11, further comprising:
determining that the information is unacceptable; and
sending a negative acknowledgment to the neighboring base station to trigger negotiation.

18. The method of claim 11, further comprising:
receiving conflicting information on the resources from the neighboring base station; and
adjusting the lower rank regions in the own resource map towards complying with the conflicting information from the neighboring cell.

19. An apparatus, comprising:
at least one memory including computer program code; and
at least one processor,
wherein the at least one memory and the computer program code are configured to, with the at least one processor, cause the apparatus at least to
define indexing of resources for which a base station will restrict a maximum rank for transmission; and
inform a neighboring base station about the resources for which the base station will restrict the maximum rank of transmission.

20. The apparatus of claim 19, wherein the at least one memory and the computer program code are configured to, with the at least one processor, cause the apparatus at least to agree with all other base stations in a neighborhood a policy for a distributed mechanism to coordinate utilization of multi-stream transmissions among base stations.

* * * * *